Feb. 2, 1932.  H. ENGSTFELD  1,843,713
WET GAS METER
Filed June 5, 1926   2 Sheets-Sheet 1
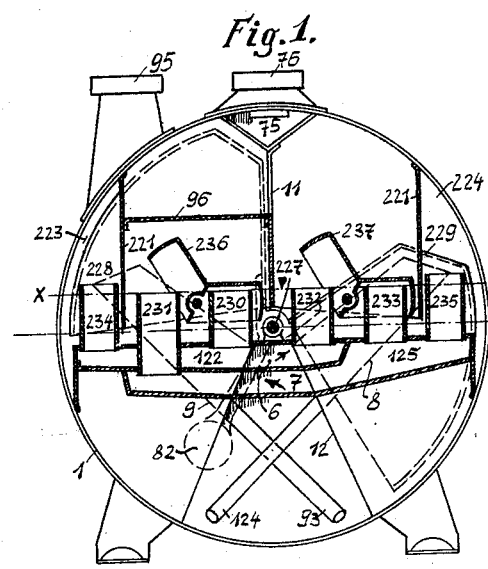
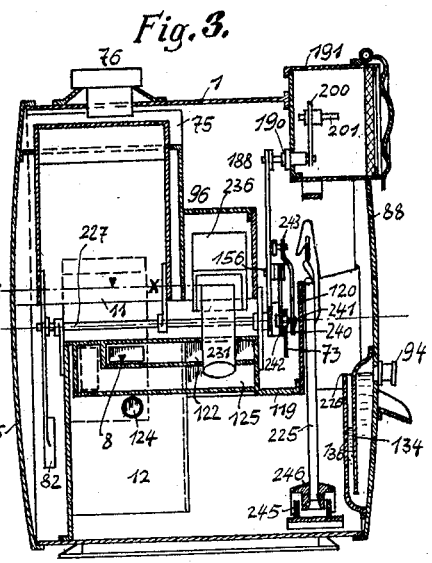
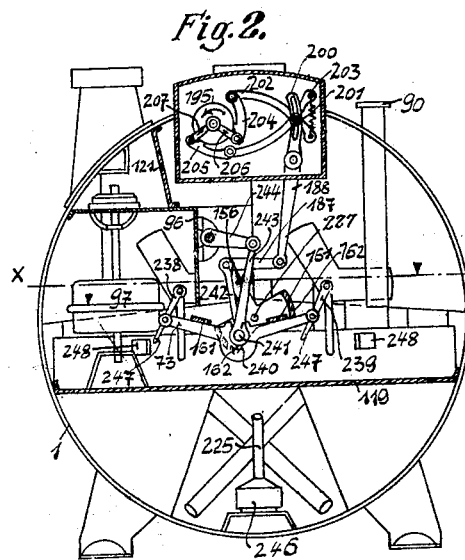
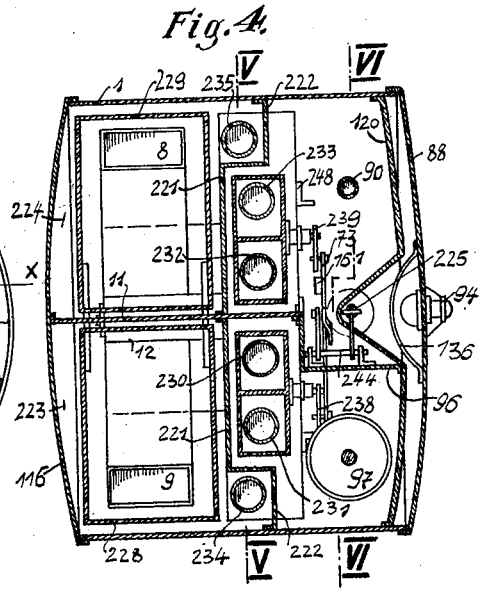

Patented Feb. 2, 1932

1,843,713

UNITED STATES PATENT OFFICE

HANS ENGSTFELD, OF VIENNA, AUSTRIA

WET GAS METER

Application filed June 5, 1926, Serial No. 113,987, and in Austria June 19, 1925.

Gas meters with rocking measuring sections or elements as heretofore proposed, have been found objectionable in many respects, more particularly in some of them it is necessary to maintain the liquid in two parts at different levels which requires packing or seals difficult to construct and unreliable in construction. In other types the mechanism controlling the gas flow comprises sliding surfaces which slide one upon the other so that due to the sliding friction wear and tear takes place in a short time and gas may escape without being measured.

The object of my invention is to provide a gas meter with rocking measuring elements in which the mass of the rocking parts and the volume of the whole meter, is greatly reduced, the driving power, necessary for the operation of the meter, is increased and the construction is simplified.

A further object of my invention consists in reducing the "no-load work" of the gas meter by the provision of controlling devices the resistances of which against motion are much less than heretofore.

With these objects in view my invention consists in the combination of a measuring element consisting of sections connected with each other and adapted to rock independently about a common axis, each of such sections being provided with a partition parallel to or passing through the axis and having its lower edge permanently submerged in the liquid, with control devices arranged near the centre of the meter and comprising inlet and exhaust ducts and rocking two compartment hoods, each hood being associated with a pair of such ducts and controlling the associated ducts by a liquid seal.

In all the heretofore well known constructions of wet gas meters the gas distributing and controlling devices (the pipes, channels, hoods, valves, slide-valves, cocks or the like) are arranged above or below the measuring elements. By such an arrangement the height of the meter is increased without offering any advantage, the rocking angle of the measuring elements is less than in an arrangement in which the channels are located centrally below the rocking axis of the measuring elements, as in the present application.

The channels being arranged centrally make it possible to remove the liquid from these channels in a simple manner and draining of the gas conducting chambers is avoided under all circumstances. Because of the arrangement here disclosed it is possible to provide siphons to remove the liquid without increasing the height of the meter. The controlling distributing elements (hoods) can be driven directly from the measuring spindle.

I may combine a plurality of such measuring elements with the interposition of stationary sections, in such a manner that each rocking measuring element rocks in a separate measuring or displacement chamber enclosed by the associated stationary section.

In the annexed drawings I have shown by way of example several constructional forms of my invention.

The Figs. 1 to 4 show a double acting two compartment meter in which Fig. 1 is a vertical section on the line V—V of Fig. 4.

Fig. 2 is a vertical section along the line VI—VI of Fig. 4, and the

Figs. 3 and 4 are vertical and horizontal sections through the axis of the meter respectively.

Figure 5:
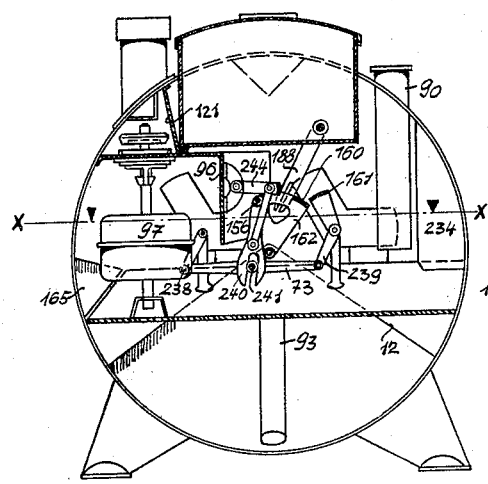
Figure 7:
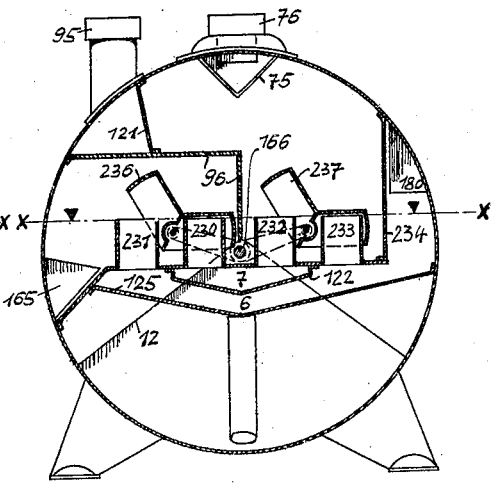
Figure 6:
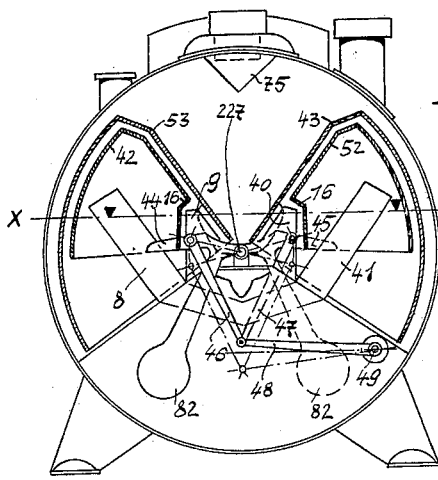
Figure 8:
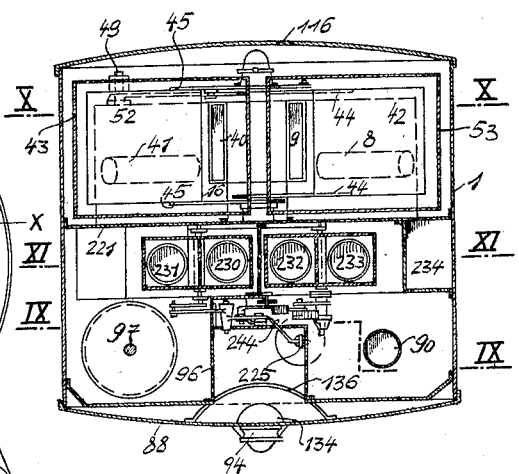

The Figs. 5–8 are a development of the meter according to Figs. 1–4 in which the Figs. 5, 6, 7 are vertical sections on the lines IX—IX, X—X, XI—XI of Fig. 8 respectively and Fig. 8 is a horizontal section through the axis of the meter.

In Figs. 1 to 4 a double acting two compartment meter is shown having a single axis and external distributing hoods in which a friction gear is used for actuating the counter.

The casing formed by the front wall 88 the rear wall 116 and the cylinder wall 1 is divided by partitions 12 substantially radial or parallel to the axis and extending below the deepest possible water level with a certain extra dip for the sake of safety. The partition 221 parallel to the rear wall separates the measuring space from the front space. The partition is bent to form offsets 222 adjacent opposite sides of the cylindrical wall for the connecting pipes 234 and 235 to the measuring space. A radial vertical partition 11 beginning at the rear wall 116 and extending through the partition 221 divides the measuring space into two equal halves 223, 224 and the bottom end of the partition 11 extends below the lowest possible water level while its top edge is bifurcated forming with the cylindrical wall 1, a channel 75. The front side of the front box is formed by a wall 120 perpendicular to the axis and formed with a deep recess in its middle part for providing the required space for the gearing 225. A horizontal plate 119 connects the bottom portion of wall 120 to the wall of channel 125. The front box is divided by a partition 96 located between the partition 221 and the wall 120 and extending below the water level into an admission and an escape chamber. The admission chamber contains the valve box 121 with the inlet valve, the float chamber with the float 97 and the distributing elements forming part of the control devices controlling the admission while in the escape chamber the control link and lever gearing, the elements controlling the exhaust and the filling tube 90 are mounted. The latter extends below the lowermost water level at which the float closes the valve. On the front wall the water seal 136 with the overflow edge 226 the pipe 134 and the escape plug 94 are mounted.

Below the partition 11 a shaft 227 is journalled to which the measuring sections or elements 228, 229 are connected of which each rocks in a separate measuring chamber 223 or 224. These sections are substantially in the shape of cylinder sectors and are open at the bottom. In the bottom part of the measuring chamber into which the measuring sections do not enter the chamber 12 is arranged, the main part of which is below the water level and is provided on its top part with two central channels 6, 7 from which pipes or ducts 8, 9 lead into the interior of the measuring sections and transverse channels 122, 125 arranged above the bottom plate 119 of the front chamber and lead below the admission and the escape compartments. From each of these transverse channels 122, 125 a pipe 230 or 231 projects into the admission compartment, a pipe 232 or 233 into the escape compartment and a pipe 234 or 235 into the measuring spaces 223, 224 above the measuring sections. Each pair of pipes 230, 231 and 232, 233 leading into the admission and escape chambers respectively is controlled by one double distributing hood 236 or 237 both hoods being positively coupled with each other. The pipe 230 leading to the admission chamber from the transverse channel 122 and the pipe 233 of the transverse channel 125 leading into the escape chamber are closed simultaneously by the distributing hoods 236, 237 while the pipes 231, 232 are open then on rocking the distributing hoods 231 and 232 are closed while the hoods 230 and 233 are opened.

The shafts of the distributing hoods are journalled in the front box and carry each at its front end a crank 238 or 239 the pins of which are connected by a link 73. This link is provided in its middle part with a vertical slot 240 into which engages a pin or shaft 241 the other end of which is connected to a crank 156 secured to the shaft 227 of the measuring sections. This crank is provided with two pawls 162 somewhat resembling a watch escapement. The pawls cooperate with ribs 161 arranged on the link 73; the pin 241 working in the slot 240 of the link is fixed to a pusher bar 243 which is connected to the link and lever gearing 225 of the piston of a replenishing device by means of a double lever 244 pivoted to the float chamber 96. The replenishing device consists of a piston 246 freely movable in a sleeve 245 through the hollow piston rod 225 of which the liquid can flow upwards. In order to avoid jamming in the link and lever gearing described, the link 242 itself carries no pin, but embraces the pin of the crank 156 and that of the pushing rod 243. Besides the latter is so bent that its connecting point with the lever 244 and the link 242 are in a vertical plane (Fig. 3). Moreover the pin of the crank 156 is connected to a link 187 which causes to rock a lever 188 actuating the counter (Fig. 2). The counter is enclosed in a box 191 which is so mounted on the cylindrical wall 1 and the front wall 88 that only the cover and the front wall of this box are outside the casing. Thereby the counter is made readily accessible since after removal of the cover of the counter casing the counter proper is accessible without removing the front wall. The fulcrum of the lever 188 passes tightly through a stuffing box 190 in the rear wall of the counter casing and carries the slotted lever 200 in the slot of which a pin 201 is adjustable for varying the amplitude of the movements of the link and lever gearing actuating the counter. To this pin two pushing bars 202, 203 are connected the shorter bent arms of which are forced towards each other by a spring while their other arms are pivoted to the free ends of the clamping jaws 204, 205. The other ends of these clamping jaws are pivoted at their other ends to guiding links 206, 207 capable of rocking around the driving shaft of the counter. The jaws are in one side frictional engagement with a clamping disc 195 coupled with the driving shaft of the counter so that the oscillatory movement of the lever is transformed into a rotary one of the counter driving shaft (see Fig. 2).

Before admitting gas to the meter it is filled with liquid (oil, water) to the level x—x. The liquid enters through the filling tube 90 into the escape and admission compartments of the front box first, flows into the space containing the measuring sections, rises in the latter and in the front box and flows through pipes 230 to 233 into the connecting channels 122, 125 and flows from the latter through the channels 6, 7 into the pockets 8, 9, and through pipes 93 and 124 respectively, connected below the channels into the chamber 12 and the bottom part of the cylindrical wall 1. The liquid then rises in the reservoir above the overflow edge 226 into the liquid seal 136 and rises in the pipe 134 and escapes at 94. After the meter is filled with liquid, the float 97 rises and thereby opens the valve so that the interior of the meter is under gas pressure. Consequently the water level in the seal 136 is depressed rising in the pipe 134 so that the excess of water flows out through the plug 94. The meter is now ready for use.

The front box and the measuring chambers are in direct communication and are separated from each other only after filling with water by the partition 221 dipping into the liquid. Therefore after filling the water reaches in both chambers up to the level of the open top ends of the pipes 230, 233 so that the measuring sections as well as the distributing hoods (the latter only in the closing position) are permanently closed by water seals. In the same manner the two measuring compartments 223, 224 are separated from each other, after the water has been filled in, by the partition 11 dipping into the water. The chamber 12 and the reservoir are in direct communication with each other and in both of them the water reaches to the level of the overflow edge 226 of the water seal 136 so that the escape pipes 93, 124 of the pockets are permanently water sealed leading nearly to the bottom part of the cylindrical wall for preventing an accidental escape of gas. The gas entering through the admission pipe 95 flows when the valve is open through the valve box 121 into the float chamber and thence with the position of the distributing hoods shown through the pipe 231 into the channel 125. From this it flows on the one hand through the pipe 235 into the right hand measuring compartment 224 above the measuring section 229 and on the other hand through the channel 7 and the pocket 9 below the left hand measuring section 228. When this measuring section is in its lowermost position it will be raised by the inflowing gas. At the same time however, the measuring section 229 rocking in the measuring compartment 224 and rigidly connected to the first named measuring section will be moved downwards by the gas acting on the same from above. These two pressures acting in the same sense are added to each other and serve for forcing out the gas already present in the measuring section 229 and in the measuring compartment 223 above the measuring section 228. Furthermore on forcing downwards the section 229 the gas contained therein is forced through the pocket 8 into the pipes 6 and 122 while the gas contained in the compartment 223 is forced on raising the section 228 through the pipe 234 into the pipe channel 122. Thence the gas already measured flows through the pipe 232 into the escape chamber of the front box and through the channel 75 connected thereto to the escape pipe 76. After rocking the distributing hoods which always takes place at the moment when the movement of the measuring sections has to be reversed, the gas flows within the meter in the opposite direction. If gas flows below the right hand measuring section 229 and above the left hand measuring section 228 the crank 156 on the shaft 227 of the measuring section is turned counterclockwise, the link 73 and the cranks 238, 239 being prevented from partaking in this movement by the fact that the right hand escapement pawl 162 strikes against the left hand end of the right-hand rib 161 provided on the link 73. Consequently the distributing hoods remain at rest in the position opposite to that shown. As also the slot 240 remains in its position owing to the rotation of the crank 156 by means of the link 242, the pin 241, the pushing rod 243 and the double lever 244, the piston 246 of the replenishing device is slowly raised. Directly in the left hand reversing position of the measuring sections and of the crank 156 the right hand escapement pawl 162 is disengaged from the right hand rib 161 of the link 73 so that this link moves suddenly to the left under the action of the weight of the replenishing piston whereby the distributing hoods are brought into the position shown in Fig. 2 by means of their cranks and thus the gas admission is reversed. In order to avoid a violent knocking of the measuring hoods (noise) and to limit the stroke of same, their cranks carry projections 247 which strike against buffers 248 for instance of lead. The replenishing apparatus serves the same purpose which contributes to reducing noise in the manner of a hydraulic brake. The rapid downwards movement of the replenishing piston brings about besides this reversion also a raising of the water through the hollow piston rod 225 which water enters the front box for maintaining constant the water level in the same.

The clockwise movement of the crank 156 is transmitted through the link 187 to the levers 188 and 200 of the counter. The slotted lever 200 moves from the central position shown to the left whereby on the one hand the clamp jaw 205 is caused to disengage the clamp disc 195 by the pushing bar 203 and is brought into the position ready for operation, and on the other hand the clamp jaw 204 is brought into firm engagement with the clamp disc by the pushing rod 202 and the clamp disc and therefore also the driving shafts of the counter are moved in the direction of the arrow. The return movement of the lever 200 causes the clamp jaw 204 to disengage while the jaw 205 comes into engagement with and turns the clamp disc in the same direction.

The meter shown in Figs. 5 and 8 is a further development of the meter above described. In this constructional form two systems of measuring sections are arranged to rock the one within the other so that this meter may be called a two axis quadruple acting two compartment meter. The casing again consists of the front wall 88, the rear wall 116 and the cylindrical wall 1, but is not provided with a radial partition 11 to divide the measuring chamber into two halves, but both measuring sections rock in the same measuring chamber. This is enclosed on the one hand by the walls 116 and 1 and on the other hand by the partition 221 perpendicular to the axis and the walls of the chamber 12. The partition 221 is not constructed as a dipping partition but completely separates the measuring chamber from the front box and the water chamber. The latter two communicate with each other only by an opening 165 for filling in the water, this opening being far below the normal water level. The front box is divided by a dipping partition 96 into an admission and an escape chamber the same as in the meter shown in Figs. 1 and 4. In these chambers the valve, the float 97, the filling tube 90 and the other parts are arranged the same as in the meter above referred to, and from the escape chamber a channel 75 leads to the escape 76. Centrally of the casing a shaft 227 is journalled, an opening 166 for the same to pass through to the front box being provided in the drum wall and the measuring sections 42, 43, 52, 53 rock around the axis of this shaft. In each half of the measuring chamber a large measuring section 43 or 53 and inside each of the latter a small measuring section 42 or 52 is arranged all four measuring sections being adapted to rock around the shaft 227. Each of the small measuring sections is firmly connected by arms 44 or 45 with a large measuring section oscillating in the other half of the measuring chamber each of these arms carrying a pendulum weight 82 for balancing the two measuring systems. Now in order to transmit the movement of the two sections to the counter one pair of the arms 45 and therefore one system of measuring sections 52, 53 is firmly connected with the shaft 227 while the other arm 44 and their measuring sections 42, 43 are freely rotatable around this shaft. For coupling the two systems of measuring sections on each of one of the arms 44, 45 a link 46 or 47 is pivoted to one arm at the same distance from the axis as the pivot for another arm, the other ends of these links being connected to the free end of a rocking lever 48 journalled at 49 in the chamber 12. The links 46, 47 are equal in length and have for their effect that both pairs of measuring sections oscillate symmetrically relatively to the central plane of the meter. The chamber 12 closed at its rear end leaves free so much space between it and the rear wall 116 that the pendulums and the links may oscillate freely. Below the bottom of the measuring chamber two channels 6, 7 are provided. The channel 7 communicates with two pockets 9, 40 which lead into the interior of the large measuring sections 43, 53 and thus between the small and the large measuring sections. The channel 7 leads to a transverse channel 122 from which pipes 230, 232 lead to the admission and the escape chamber respectively of the front box of the meter. In order to provide the required space for the pockets 9, 40 in the position in which the small measuring sections are farthest inserted into the larger ones, the smaller measuring sections are provided with corresponding recesses 16 into which lead the pockets 9, 40. From the central channel 6 pipes 8, 41 lead into the interior of the small measuring sections 42, 52 and on the other hand this channel 6 communicates with a transverse channel 125 from which pipes 231, 233 lead into the admission and into the escape chambers and which is directly connected with the measuring chamber by means of a channel 234 and an opening 180 in the drum wall 221 above the highest water level. The pair of pipes 230, 231 entering the admission chamber as also the pair of pipes 232, 233 leading into the escape chamber are controlled by distributing hoods 236, 237 in the same way as in the meter described with reference to Figs. 1 and 4, said hoods being constituted as liquid seal valves only the control gear is constructed somewhat differently.

Each of the axes of the distributing hoods carries at its front end a crank 238 or 239 the pins of which are connected by a link 73 so that the cranks rotate in the same direction. A sliding pin (roller) 241 fixed on the middle of the link 73 works in the slot of a fork 240 engaging the pin 156 of the crank 162 fixed to the shaft 227. This rocking crank 162 is provided with an abutment rib 160 which cooperates with an abutment rib 161 secured to one of the distributing hood axes. The crank 162 makes a rocking movement according to the movement of the rocking measuring section. Therefore the rib 160 moves also alternately in an opposite direction. On the crank 162 the fork 240 is journalled in which the pin 241 of the link 73 connecting the cranks 238, 239 of the controlling hoods 236, 237 moves. For example, it is supposed that the crank 162 moves in a counter-clockwise direction (that is to say from the right hand to the left hand in Fig. 5), and that the control hoods are in the position shown in Figs. 5 and 7. As long as the joint 156 lies on the right side of a vertical line extending through the middle of the pin 241, control devices 236, 237 cannot swing from right to left. At the moment in which the joint 156 (arranged on the crank 162) passes the vertical line through the point 141 from right to left, a power component is transmitted to the point 241 through the medium of the fork 240, the direction of which is from left to right, that is to say this power component would move the cranks 238, 239 in the right hand end position. But as it is necessary that the control hoods be reversed suddenly, this right hand movement of the pin 241 is not permitted in the first moment since the rib 161 of the control hood 273 engages or is locked by the rib 160 of the crank 162. It is only after the rib 161 is moved to the left so that the rib 160 comes out of engagement with the rib 161 that the rib 161, the hood 237, the crank 239, the link 73 and the pin 241 are freed so that these parts and all the other parts coupled with the link 73 suddenly move to the opposite end position, that is to say, the hoods 236, 237 move from the right to the left while the pin 241 suddenly moves from the left to the right. This sudden movement is effected by the weight of the piston of the replenished pump which is coupled by means of the lever 244 and the link with the fork 240. A replenishing device constructed as shown in Fig. 7 is driven by the crank 162 through the medium of a link pivoted to the fork 240 and connected at the other end to a bent lever 244 extending over the front plate and directly connected to the piston rod 225 of the replenishing apparatus. When the piston is slowly raised the liquid flows under the piston through the radial clearance between the sleeve 245 and the piston wall. From its highest position the piston moves downwards with great rapidity under the influence of its weight. By this movement the liquid is dashed high through the hollow piston rod 225 as the radial clearance acts as a labyrinth packing of comparative great resistance, during this rapid downwards movement of the piston. The movement of the driving mechanism of the counter is in the present case derived from the crank 156 by a single lever 188 in the slot of the outer end of which works a pin fixed on the crank 162 and the other end of which is connected with the adjusting lever not shown of the counter in the manner previously described. The meter is filled with liquid (water). This enters through the filling tube 90 into the front chamber and flows through the opening 165 into the measuring chamber, rises in both chambers and then falls through the pipes 231, 232 into the transverse and central channels and flows from the latter through dipping tubes 93 into the water reservoir. In this the water rises and the excess of water escapes in the manner described through the water seal 136, pipe 134 and escape plug 94. At the same time the float 97 is raised and thus the valve is opened so that gas can enter.

The incoming gas reaches in the well known manner the admission chamber. In the position of the distributing hoods shown in Fig. 7 the gas flows through the pipe 231 into the transverse channel 125 and from this on the one hand through the channel 6 and the pipes 8, 41 below both small measuring chambers 42, 52 and on the other hand through the channel 234 and the opening 180 into the measuring chamber above the large measuring sections. As both systems of measuring sections are coupled by means of the links a small measuring section and the large measuring section enclosing the same move towards each other the two pairs of measuring sections moving symmetrically relatively to the central plane of the meter. Thereby the gas contained between each of the small measuring sections and the large measuring section enclosing the same is forced through the pockets 9, 40 into the channels 7 and 122 and from these it escapes through the pipe 232 into the escape chamber and further on through the channel 75 and the escape pipe 76. When the distributing hoods 236, 237 are tilted the gas having entered below the small and above the large measuring sections is forced out in the opposite direction by the fresh gas entering between the measuring sections. The position of the distributing gear shown in Fig. 5 corresponds to the position of the distributing hoods shown in Fig. 6. The operation of the distributing gear and of the driving mechanism of the counter is the same as in the meter shown in Figs. 1 and 4. Of course the distributing elements of the two meters might be interchanged without, in any way interfering with the operation.

What I claim is:

1. In a wet gas meter the combination of a casing partly filled with liquid and enclosing an inlet, an exhaust and a measuring chamber, the level of the liquid being substantially the same in all of the said chambers, a measuring element located in such measuring chamber and comprising measuring sections adapted to rock around an axis common to all of them, and relatively to each other, the rocking measuring sections each having a wall substantially parallel to such axis and an opening in the bottom, the bottom edge of such wall and of such opening permanently dipping into the liquid, control devices for controlling the flow of the gas into and out of the said measuring sections, a counter, means for operatively connecting the said measuring element with the said control devices and counter, the said control devices being arranged near the center of the meter and comprising inlet and exhaust ducts having open ends, projecting beyond the liquid and communicating with the interior of the said measuring sections and with the said inlet and exhaust chambers, the said control devices also comprising hoods and rocking shafts for the hoods, and a shaft connected to one of the measuring sections, each hood being associated with a pair of such ducts and consisting of two compartments open on bottom and separated from each other by a wall the bottom end of which permanently dips into the liquid, and the open bottom of the said compartments being adapted to dip alternately into the liquid surrounding the open top ends of the associated ducts and to rise above such liquid, and said means including mechanism connecting the rocking shafts with the shaft of one of the measuring elements.

2. In a wet gas meter the combination of a casing partly filled with liquid and enclosing an inlet, an exhaust and a measuring chamber, the level of the liquid being substantially the same in all of the said chambers, a measuring element located in such measuring chamber and comprising measuring sections adapted to rock around an axis common to all of them, each of the said measuring sections having a wall substantially parallel to such axis and an opening in the bottom, the bottom edge of such wall and of such opening permanently dipping into the liquid, control devices for controlling the flow of the gas into and out of the said measuring sections, a counter, means for operatively connecting the said measuring element with the said control devices and counter, the said control devices being arranged near the center of the meter and comprising inlet and exhaust ducts having open ends, projecting beyond the liquid and communicating with the interior of the said measuring sections and with the said inlet and exhaust chambers, the said control devices also comprising hoods and rocking shafts for the hoods, each hood being associated with a pair of such ducts and consisting of two compartments open on bottom and separated from each other by a wall the bottom end of which permanently dips into the liquid, and the open bottom of the said compartments being adapted to dip alternately into the liquid surrounding the open top ends of the associated ducts and to rise above such liquid.

3. In a wet gas meter the combination of a casing partly filled with liquid and enclosing an inlet, an exhaust and a measuring chamber, the level of the liquid being substantially the same in all of the said chambers, a measuring element located in such measuring chamber and comprising, measuring sections adapted to rock around an axis common to all of them, and relatively to each other, each of the rocking measuring sections having a wall substantially parallel to such axis and an opening in the bottom, the bottom edge of such wall and of such opening permanently dipping into the liquid, control devices for controlling the flow of the gas into and out of the said measuring sections, a counter, means for operatively connecting the said measuring element with the said control devices and counter, the said control devices being arranged near the center of the meter and comprising inlet and exhaust ducts having open ends, projecting beyond the liquid and communicating with the interior of the said measuring sections and with the said inlet and exhaust chambers, the said control devices comprising hoods and rocking shafts for the hoods, each hood being associated with a pair of such ducts and consisting of two compartments open on bottom and separated from each other by a wall the bottom end of which permanently dips into the liquid, and the open bottom of the said compartments being adapted to dip alternately into the liquid surrounding the open top ends of the associated ducts and to rise above such liquid, the said means for operatively connecting the measuring element with the control devices and the counter comprising a link and lever gearing having lost motion and interconnecting the measuring element and the control devices, means for locking and unlocking the control device in predetermined positions, said control devices being adapted to be started by gravity, when unlocked.

4. In a wet gas meter the combination of a casing partly filled with liquid and enclosing an inlet, an exhaust and a measuring chamber, the level of the liquid being substantially the same in all of the said chambers, a measuring element located in such measuring chamber and comprising, measuring sections adapted to rock around an axis common to all of them, and relatively to each other, each of the rocking measuring sections having a wall substantially parallel to such axis and an opening in the bottom, the bottom edge of such wall and of such opening permanently dipping into the liquid, control devices for controlling the flow of the gas into and out of the said measuring sections, a counter, means for operatively connecting the said measuring element with the said control devices and counter, the said control devices being arranged near the center of the meter and comprising inlet and exhaust ducts having open ends, projecting beyond the liquid and communicating with the interior of the said measuring sections and with the said inlet and exhaust chambers, the said control devices also comprising hoods and rocking shafts for the hood, each hood being associated to a pair of such ducts and consisting of two compartments open on bottom and separated from each other by a wall the bottom end of which permanently dips into the liquid, and the open bottom of the said compartments being adapted to dip alternately into the liquid surrounding the open top ends of the associated ducts and to rise above such liquid, the said means for operatively connecting the measuring element with the control devices and the counter comprising a shaft connected to at least one of the measuring sections, a crank on such shaft, a link and lever gearing having lost motion and interconnecting the said crank and the control devices, means for locking and unlocking the control devices in predetermined positions, said control devices being adapted to be started by gravity, when unlocked.

5. In a wet gas meter the combination of a casing partly filled with liquid and enclosing an inlet, an exhaust and a measuring chamber, the level of the liquid being substantially the same in all of the said chambers, a measuring element located in such measuring chamber and comprising, measuring sections adapted to rock around an axis common to all of them, and relatively to each other, each of the rocking measuring sections having a wall substantially parallel to such axis and an opening in the bottom, the bottom edge of such wall and of such opening permanently dipping into the liquid, control devices for controlling the flow of the gas into and out of the said measuring sections, a counter, means for operatively connecting the said measuring element with the said control devices and counter, the said control devices being arranged near the center of the meter and comprising inlet and exhaust ducts having open ends, projecting beyond the liquid and communicating with the interior of the said measuring sections and with the said inlet and exhaust chambers, the said control devices also comprising hoods and rocking shafts for the hoods, each hood being associated to a pair of such ducts and consisting of two compartments open on bottom and separated from each other by a wall the bottom end of which permanently dips into the liquid, and the open bottom of the said compartments being adapted to dip alternately into the liquid surrounding the open top ends of the associated ducts and to rise above such liquid, the said means for operatively connecting the measuring element with the control devices and the counter, comprising a link and lever gearing comprising two elements having lost motion and interconnecting the said measuring element and the control devices, means for locking and unlocking the control devices in predetermined positions, such locking and unlocking means comprising an escapement pawl mounted on one element of the said link and lever gearing and a rib adapted to engage with the said escapement pawl mounted on another element of the said link and lever gearing, said control devices being adapted to be started by gravity, when unlocked.

6. In a wet gas meter the combination of a casing partly filled with liquid and enclosing an inlet, an exhaust and a measuring chamber, the level of the liquid being substantially the same in all of the said chambers, a measuring element located in such measuring chamber and comprising, measuring sections adapted to rock around an axis common to all of them, and relatively to each other, each of the rocking measuring sections having a wall substantially parallel to such axis and an opening in the bottom, the bottom edge of such wall and of such opening permanently dipping into the liquid, control devices for controlling the flow of the gas into and out of the said measuring sections, a counter, means for operatively connecting the said measuring element with the said control devices and counter, the said control devices being arranged near the center of the meter and comprising inlet and exhaust ducts having open ends, projecting beyond the liquid and communicating with the interior of the said measuring sections and with the said inlet and exhaust chambers, the said control devices also comprising hoods and rocking shafts for the hoods, each hood being associated to a pair of such ducts and consisting of two compartments open on bottom and separated from each other by a wall the bottom end of which permanently dips into the liquid, and the open bottom of the said compartments being adapted to dip alternately into the liquid surrounding the open top end of the associated ducts and to rise above such liquid, the said means for operatively connecting the measuring element with the control devices and the counter comprising a link and lever gearing comprising two elements having lost motion and interconnecting the said measuring element and the control devices, means for locking and unlocking the control device in predetermined positions, such locking and unlocking means comprising an escapement pawl mounted on one element of the said link and lever gearing and a rib adapted to engage with the said escapement pawl mounted on another element of the said link and lever gearing; a pin on the element mounting the said escapement pawl, a rocking lever adapted to engage with such pin and to actuate the counter, said control devices being adapted to be started by gravity, when unlocked.

7. In a wet gas meter the combination of a casing partly filled with liquid and enclosing an inlet, an exhaust and a measuring chamber, the level of the liquid being substantially the same in all of the said chambers, a measuring element located in such measuring chamber and comprising, measuring sections adapted to rock around an axis common to all of them, and relatively to each other, each of the rocking measuring sections having a wall substantially parallel to such axis and an opening in the bottom, the bottom edge of such wall and of such opening permanently dipping into the liquid, control devices for controlling the flow of the gas into and out of the said measuring sections, a counter, means for operatively connecting the said measuring element with the said control devices and counter, the said control devices being arranged near the center of the meter and comprising inlet and exhaust ducts having open ends, projecting beyond the liquid and communicating with the interior of the said measuring sections and with the said inlet and exhaust chambers, the said control devices also comprising hoods and rocking shafts for the hoods, each hood being associated to a pair of such ducts and consisting of two compartments open on bottom and separated from each other by a wall the bottom end of which permanently dips into the liquid, and the open bottom of the said compartments being adapted to dip alternately into the liquid surrounding the open top ends of the associated ducts and to rise above such liquid, the said means for operatively connecting the measuring element with the control devices and the counter, comprising a shaft of at least one of the rocking measuring sections, a crank on such shaft and an operative connection between such crank and the counter, such connection comprising a frictional pawl and a ratchet gear.

8. In a wet gas meter the combination of a casing partly filled with liquid and enclosing an inlet, an exhaust and a measuring chamber, the level of the liquid being substantially the same in all of the said chambers, a measuring element located in such measuring chamber and comprising, measuring sections adapted to rock around an axis common to all of them, and relatively to each other, each of the rocking measuring sections having a wall substantially parallel to such axis and an opening in the bottom, the bottom edge of such wall and of such opening permanently dipping into the liquid, control devices for controlling the flow of the gas into and out of the said measuring sections, a counter, means for operatively connecting the said measuring element with the said control devices and counter, the said control devices being arranged near the center of the meter and comprising inlet and exhaust ducts having open ends, projecting beyond the liquid and communicating with the interior of the said measuring sections and with the said inlet and exhaust chambers, the said control devices comprising hoods and rocking shafts for the hoods, each hood being associated to a pair of such ducts and consisting of two compartments open on bottom and separated from each other by a wall the bottom end of which permanently dips into the liquid, and the open bottom of the said compartment being adapted to dip alternately into the liquid surrounding the open top ends of the associated ducts and to rise above such liquid, the said means for operatively connecting the measuring element with the control devices and the counter comprising a link and lever gearing having lost motion and interconnecting the said measuring element and the control devices, means for locking and unlocking the control devices in predetermined positions and a weight operatively connected with the control device and adapted to start the control devices when unlocked.

9. In a wet gas meter the combination of a casing partly filled with liquid and enclosing an inlet, an exhaust and a measuring chamber, the level of the liquid being substantially the same in all of the said chambers, a measuring element located in such measuring chamber and comprising, measuring sections adapted to rock around an axis common to all of them, and relatively to each other, each of the rocking measuring sections having a wall substantially parallel to such axis and an opening in the bottom, the bottom edge of such wall and of such opening permanently dipping into the liquid, control devices for controlling the flow of the gas into and out of the said measuring sections, a replenishing pump comprising a piston, a counter, means for operatively connecting the said measuring element with the said control devices and counter, the said control devices being arranged near the center of the meter and comprising inlet and exhaust ducts having open ends, projecting beyond the liquid and communicating with the interior of the said measuring sections and with the said inlet and exhaust chambers, the said control devices also comprising hoods and rocking shafts for the hoods, each hood being associated to a pair of such ducts and consisting of two compartments open on bottom and separated from each other by a wall the bottom end of which permanently dips into the liquid, and the open bottom of the said compartments being adapted to dip alternately into the liquid surrounding the open top ends of the associated ducts and to rise above such liquid, the said means for operatively connecting the measuring elements with the control devices and the counter comprising a link and lever gearing having lost motion and interconnecting the said measuring element and the control devices, means for locking and unlocking the control devices in predetermined positions and means for operatively connecting the said piston of the replenishing pump with the control devices, said piston being adapted to start the control devices when unlocked.

10. In a wet gas meter the combination of a casing, partly filled with liquid, and enclosing an admission, an escape and at least one measuring compartment, the level of the liquid being substantially the same in all of the said compartments, measuring sections, located in said measuring compartments and adapted to rock around an axis common to all of them relatively to each other, each of the said rocking measuring sections having a wall substantially parallel to such axis and an opening on the bottom, the bottom edge of such wall and of such opening permanently dipping in the liquid, inlet and exhaust ducts communicating with the interior of said measuring sections, and control devices comprising liquid sealed valves sealed by the liquid in the casing and for controlling the flow of the gas into and out of the said measuring sections and compartments, the said liquid sealed valves being arranged near the center of the meter and cooperating with inlet and exhaust ducts, means for operatively connecting the said measuring sections with the said liquid sealed valves, such liquid sealed valves controlling the gas flow into and out of the measuring sections and compartments in such a manner, that some of the said measuring sections and compartments are connected with the admission compartment, while simultaneously all other measuring sections and compartments are connected with the said escape compartment of the meter.

In testimony whereof I have signed my name to this specification.

HANS ENGSTFELD.